United States Patent [19]
Hwang

[11] Patent Number: 5,929,937
[45] Date of Patent: Jul. 27, 1999

[54] DEVICE AND METHOD FOR GENERATING A COMPOSITE COLOR SIGNAL WITH DIGITAL QAM

[75] Inventor: In Seong Hwang, Siheung, Rep. of Korea

[73] Assignee: LG Electronics Inc., Seoul, Rep. of Korea

[21] Appl. No.: 08/991,484

[22] Filed: Dec. 16, 1997

[30] Foreign Application Priority Data

Dec. 17, 1996 [KR] Rep. of Korea ............... 96-66774
Dec. 17, 1996 [KR] Rep. of Korea ............... 96-66775

[51] Int. Cl.⁶ .................................... H04N 9/65
[52] U.S. Cl. .................. 348/642; 348/638; 348/639; 348/660
[58] Field of Search .................. 348/638, 639, 348/640, 641, 642, 654, 660, 724, 659; H04N 9/65

[56] References Cited

U.S. PATENT DOCUMENTS

| | | | |
|---|---|---|---|
| 4,633,187 | 12/1986 | Nishimura | 329/50 |
| 5,166,780 | 11/1992 | Shyu | 358/11 |
| 5,200,978 | 4/1993 | Lo Curto et al. | |
| 5,448,592 | 9/1995 | Williams et al. | |
| 5,638,135 | 6/1997 | Mukai | 348/642 |

OTHER PUBLICATIONS

K. Jack; "Video Demystified: A Handbook for the Digital Engineer"; Second Edition; HighText Publications (1996) pp. 153–164 and p. 232.

*Primary Examiner*—John K. Peng
*Assistant Examiner*—Wesner SaJous

[57] ABSTRACT

A device and method for generating a composite color signal are disclosed. The device includes a first memory unit for storing digital cosine data, a second memory unit for storing digital sine data, a first arithmetic unit for multiplying digital color difference data Cr input thereto with the digital cosine data, a second arithmetic unit for multiplying digital color difference data Cb input thereto with the digital sine data, and an adder for adding outputs of the first and arithmetic units to generate a digital composite color signal. The method includes the steps of storing digital cosine data and sine data in at least one of first and second memories, modulating digital color data using the stored digital sine and cosine data, and generating a composite color signal using the modulated digital color data.

9 Claims, 5 Drawing Sheets

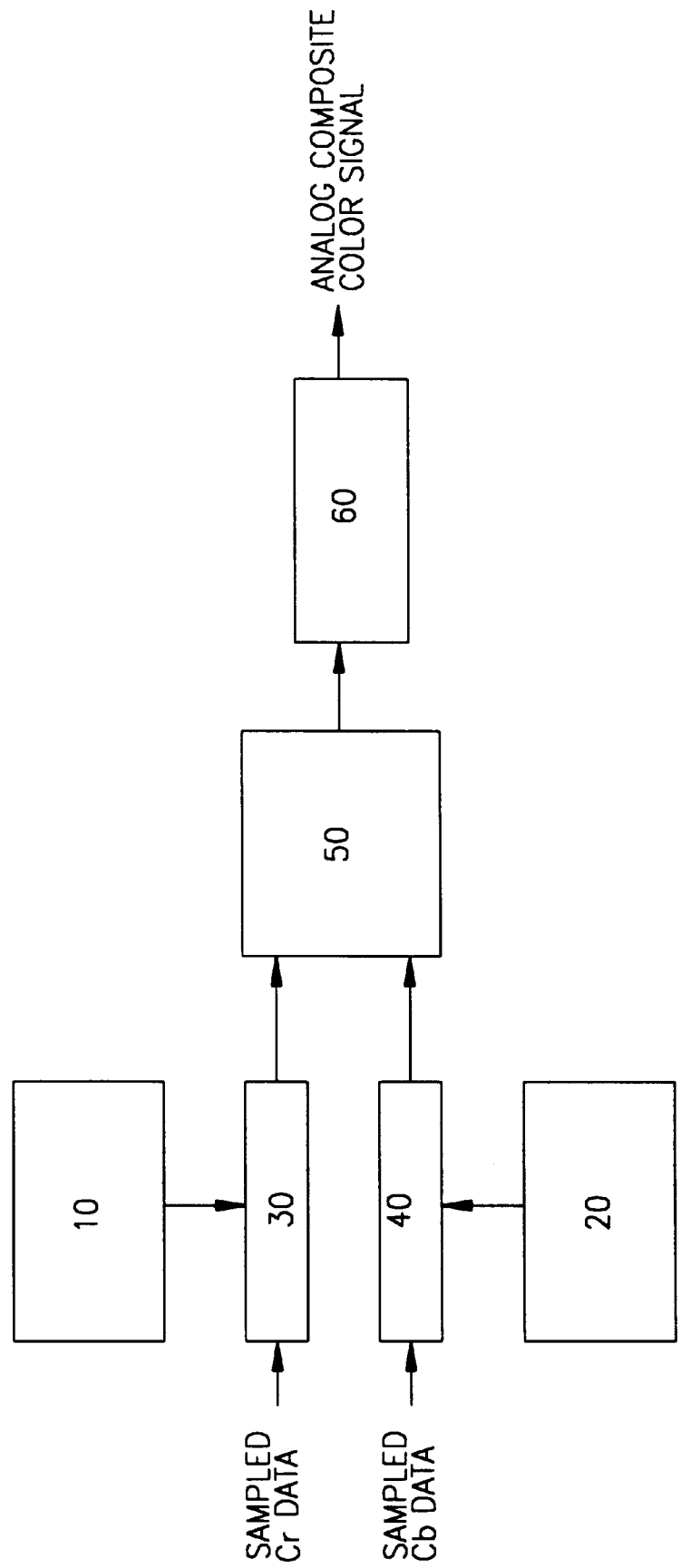

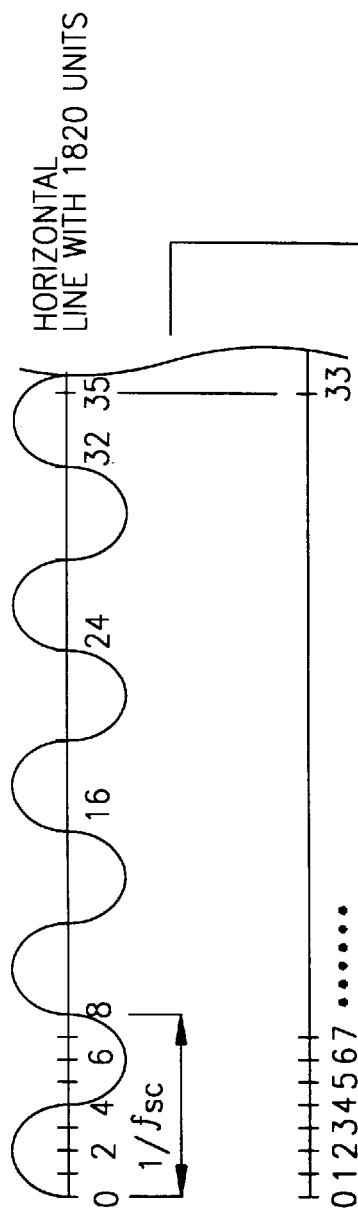
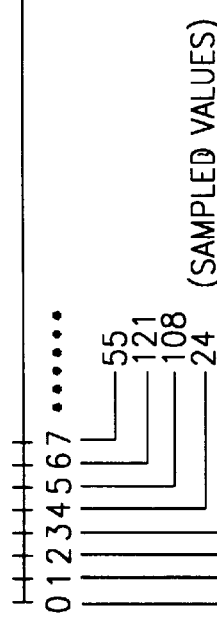
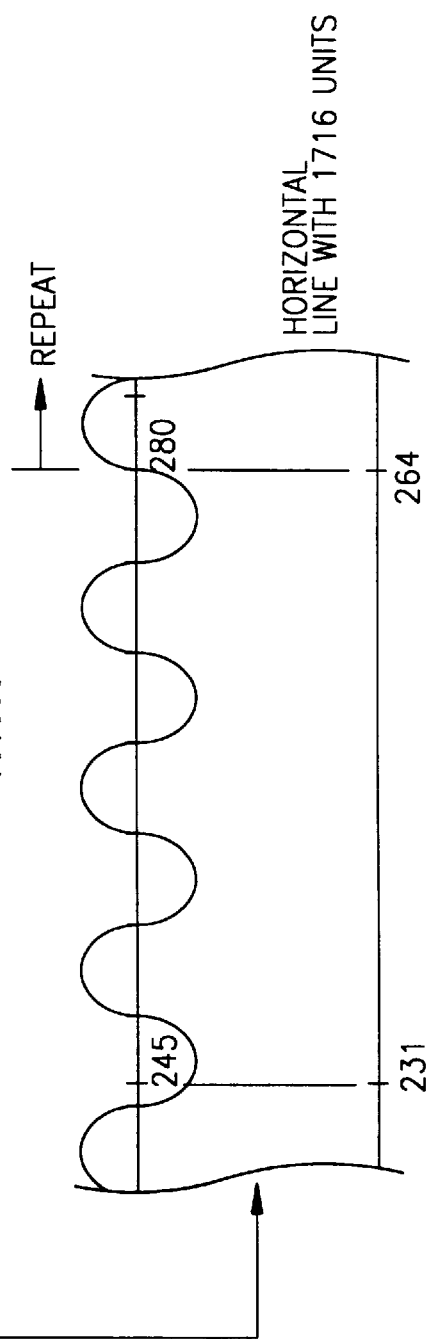
FIG.3A
FIG.3B
FIG.3C

FIG.4

| PIXEL_i | sin(RADIAN) | ST [i] | cos(RADIAN) | CT [i] |
|---|---|---|---|---|
| 0 sin( | 0.000)= | 0 | cos( 0.000)= | 127 |
| 1 sin( | 0.833)= | 93 | cos( 0.833)= | 85 |
| 2 sin( | 1.663)= | 126 | cos( 1.663)= | -12 |
| 3 sin( | 2.499)= | 76 | cos( 2.499)= | -101 |
| 4 sin( | 3.332)= | -24 | cos( 3.332)= | -124 |
| 5 sin( | 4.165)= | -108 | cos( 4.165)= | -66 |
| 6 sin( | 4.998)= | -121 | cos( 4.998)= | 35 |
| 7 sin( | 5.831)= | -55 | cos( 5.831)= | 114 |
| 8 sin( | 6.664)= | 47 | cos( 6.664)= | 117 |
| 9 sin( | 7.497)= | 118 | cos( 7.497)= | 44 |
| 10 sin( | 8.330)= | 112 | cos( 8.330)= | -58 |
| 11 sin( | 9.163)= | 32 | cos( 9.163)= | -122 |
| ⋮ | ⋮ | ⋮ | ⋮ | ⋮ |
| 258 sin( | 214.913)= | 121 | cos(214.913)= | 35 |
| 259 sin( | 215.746)= | 24 | cos(215.746)= | -66 |
| 260 sin( | 216.579)= | 24 | cos(216.579)= | -124 |
| 261 sin( | 217.412)= | -76 | cos(217.412)= | -101 |
| 262 sin( | 218.245)= | -126 | cos(218.245)= | -12 |
| 263 sin( | 219.078)= | -93 | cos(219.078)= | 85 |

DEVICE AND METHOD FOR GENERATING A COMPOSITE COLOR SIGNAL WITH DIGITAL QAM

BACKGROUND OF THE INVENTION

1. Field of the Invention

The present invention relates to a device and method for generating a composite video signal, and more particularly, to a device and method for generating a composite color signal using a digital quadrature amplitude modulation (digital QAM) method, wherein digital color difference signals are modulated by QAM, the modulated digital color signals are combined and converted into an analog composite color signal, and the analog composite color signal is combined with a luminance signal to generate a composite video signal.

2. Description of the Background Art

A conventional video recording/reproducing apparatus converts digital video data into an analog video signal using a digital-to-analog (D/A) converter. The digital video data includes a luminance signal Y and color difference signs Cr and Cb. Cr represents a difference between the red and luminance signals (R-Y), whereas Cb represents a difference between the blue and luminance signals (B–Y). Each of the digital luminance and color difference signals Y, Cr and Cb is separately converted into a corresponding analog signal.

In the conventional video apparatus, the analog color difference signals Cr and Cb are modulated using QAM. The modulated analog color difference signals are combined with each other and then with an analog luminance signal to generate an analog composite video signal. This technique, however, cannot prevent noise from interfering with the generated composite video signal since the analog color signals are modulated. This noise prevents reproduction of a clear analog composite video signal and interferences with a display of high definition video signals, resulting in poor quality video devices.

More particularly, in order to generate and display an analog composite color signal on a video display unit, such as a cathode ray tube (CRT), digital video data including a luminance signal Y and color difference signals Cr and Cb are separately converted into analog signals using D/A converters. To reproduce the digital video data, it is necessary to compose the analog color difference signals Cr and Cb using QAM to satisfy a conventional television standard. Using the analog QAM, the analog color difference signals Cr and Cb are multiplied by a video subcarrier signal fsc (=3.579545 MHz) to establish a 90° phase difference between the two signals. The modulated analog color difference signals are added to each other to generate an analog composite color signal.

FIG. 1A shows such a conventional analog QAM process and FIG. 1B shows a block diagram of a conventional video device performing the analog QAM process depicted in FIG. 1A.

As shown in FIG. 1B. a conventional video device for processing video signals includes a sub-carrier oscillator 1 for generating a signal having a specific subcarrier frequency (fsc), a 90° phase shifter 2, a first equilibrium modulator 3 for modulating a color difference signal Cb according to the fsc signal from the oscillator 1, a second equilibrium modulator 4 for modulating a color difference signal Cr according to a 90°—shifted fsc signal from the shifter 2, and an adder 5 for adding the outputs of first and second equilibrium modulators 3 and 4 to generate an analog composite color signal.

As shown in FIGS. 1A and 1B, the analog color difference signal Cb is input to the first equilibrium modulator 3. The oscillator 1 generates a sine signal (sin 2 πfsct) having a period of 1/fsc seconds. The shifter 2 shifts the sine signal by 90° and generates a cosine signal (cos 2 πfsct=sine (2 πfsct+90°)). The generated sine and cosine signals are respectfully input to the first and second equilibrium modulators 3 and 4 for modulating the color difference signals Cb and Cr using analog QAM.

Once the color difference signals Cb and Cb are modulated, the modulated signals are added in the adder 5 to generate an analog composite color signal. This composite color signal is subsequently combined with a luminance video signal (Y) to generate an analog composite video signal.

In the above described conventional video recording/reproducing devices, QAM is performed on analog signals. Therefore, the conventional devices suffer from noise and generate signals of low quality. Furthermore, the components of the conventional devices tend to be temperature sensitive, so that it becomes difficult to generate an accurate composite video signal. Moreover, if the above analog composite video signal with noise were to be recorded and reproduced to a TV monitor, displaying of high definition quality video signals cannot be ensured.

SUMMARY OF THE INVENTION

Accordingly, it is an object of the present invention to overcome problems and disadvantages encountered in conventional video recording/reproducing devices.

It is another object of the present invention to provide a device and method for generating a composite video signal which does not suffer from noise.

To achieve the above and other objects of the present invention, there is also provided a method for generating a composite video signal using digital QAM, in which digital color difference signals Cr and Cb are multiplied by cosine and sine data stored in a memory, the modulated color difference signals are added to each other, the added signal is converted into an analog composite color signal, and a luminance signal is added to the analog composite color signal to generate a composite video signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a method of generating a composite color signal, including the steps of storing digital cosine data and sine data in at least one of first and second memories, modulating digital color data using the stored digital sine and cosine data, and generating a composite color signal using the modulated digital color data.

Furthermore, the present invention is directed to a device for generating a composite color signal, including storing means for storing digital cosine data and sine data, modulating means for modulating digital color data using the stored digital sine and cosine data, and generating means for generating a composite color signal using the modulated digital color data.

Moreover, the present invention is directed to a device for generating a composite color signal, including a first memory unit for storing digital cosine data, a second memory unit for storing digital sine data, a first arithmetic unit for multiplying first digital color difference data input thereto with the digital cosine data, a second arithmetic unit for multiplying second digital color difference data input thereto with the digital sine data, and an adder for adding outputs of the first and second arithmetic units to generate a digital composite color signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 shows a block diagram of a device for generating a composite color signal in accordance with the embodiments of the present invention;

FIGS. 3A–3C show a relationship between a color carrier frequency and a number of pixels in a horizontal line of a TV signal for explaining the embodiments of the present invention; and FIG. 4 shows a table containing cosine and sine values used in a method for generating a composite color signal in accordance with the embodiments of the present invention.

DETAILED DESCRIPTION OF THE PREFERRED EMBODIMENTS

Figure 1A:
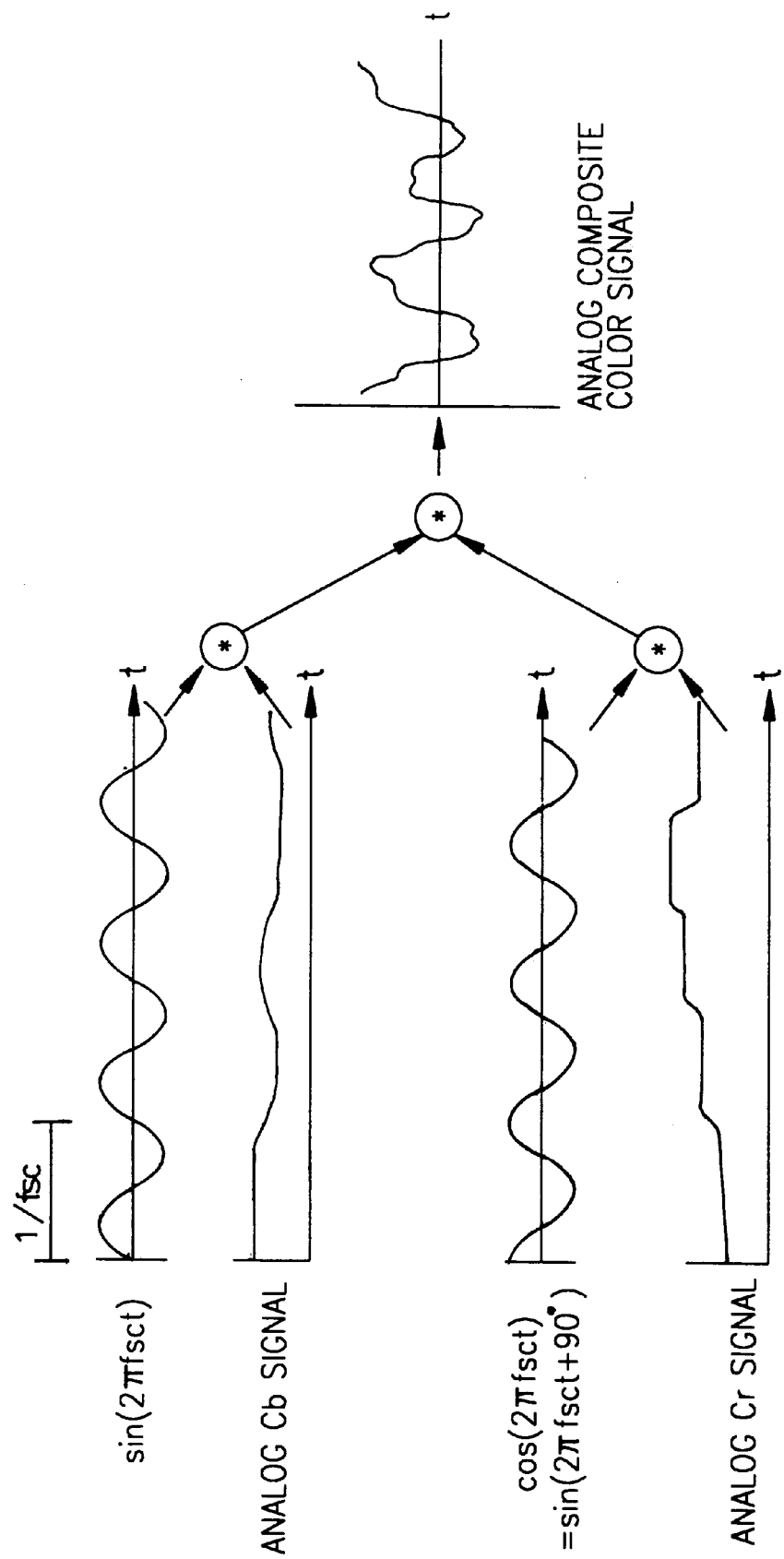
FIG. 1A shows a conventional QAM process.
Figure 1B:
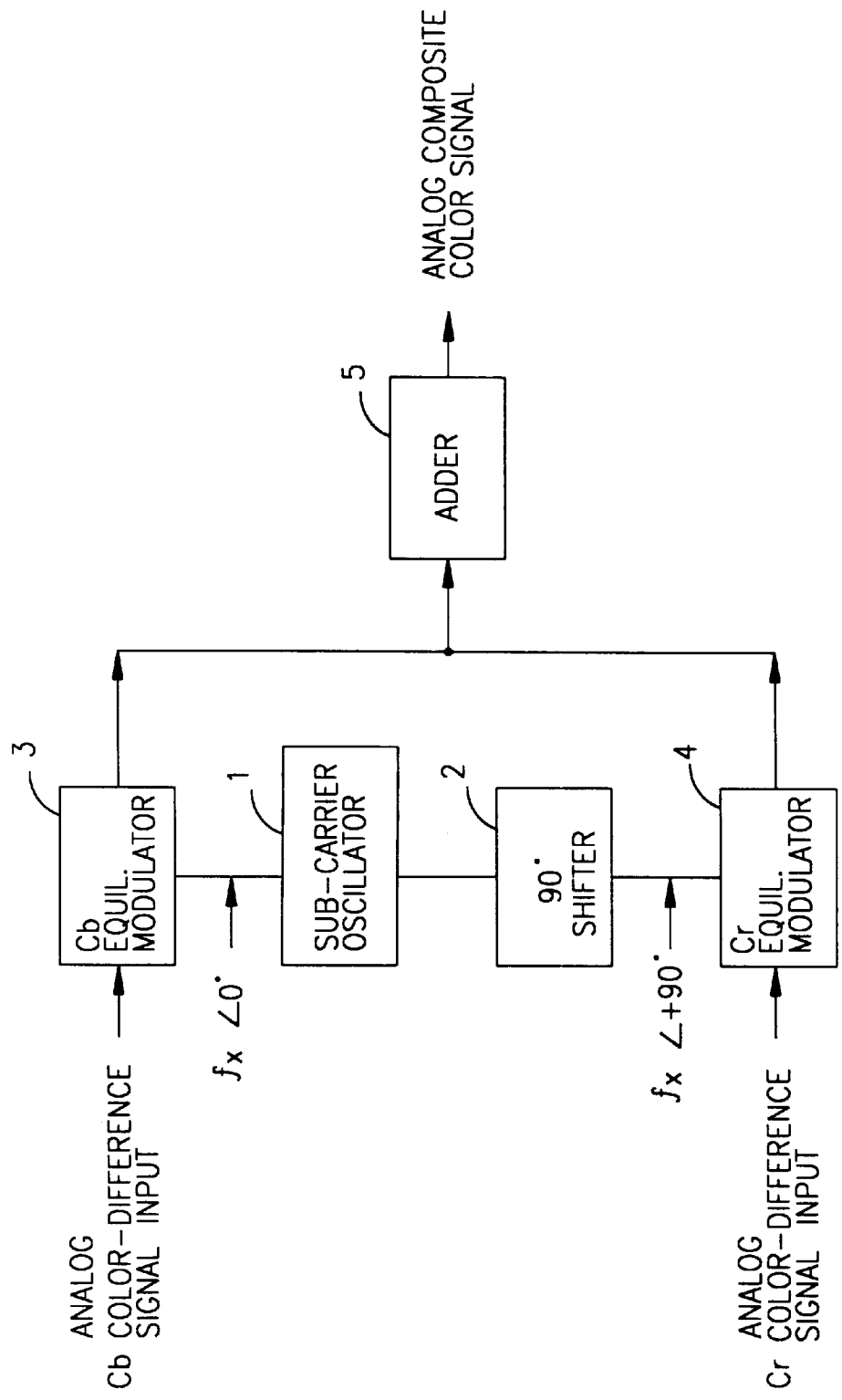
FIG. 1B shows a block diagram of a conventional QAM device.

Reference will now be made in detail to the preferred embodiments of the present invention, examples of which are illustrated in the accompanying drawings.

FIG. 2 shows a block diagram of a device for generating a composite color signal with digital QAM (Quadrature Amplitude Modulation) in accordance with the embodiments of the present invention.

According to the embodiments of the present invention, digital video data includes a luminance signal Y and color difference signals Cr and Cb. The luminance signal Y is converted into an analog luminance signal Y. The digital color difference signals Cr and Cb are modulated using digital QAM. The modulated color signals are added to each other to generate a digital composite color signal. The digital composite color signal is converted into an analog composite color signal which is combined with the analog luminance signal Y. As a result, a composite video signal is generated.

As shown in FIG. 2, the device includes a first memory unit 10 for storing cosine data used in digital QAM, a second memory unit 20 for storing sine data used in digital QAM, a first arithmetic unit 30 for multiplying a digital color difference signal Cr with a cosine data from the first memory unit 1 for modulation, a second arithmetic unit 40 for multiplying a digital color difference signal Cb with a sine data from the second memory unit 20, an adder 5 for adding the outputs of the first and second arithmetic units 30 and 40, and a D/A (Digital-to-Analog) converter 60 for converting the added digital signal into an analog composite color signal. The analog composite color signal is combined with a luminance signal to generate a composite video signal.

A method for generating a composite color signal using digital QAM in accordance with the embodiments of the present invention will be described.

As shown in FIG. 2, in case that an NTSC (National Television System Committee) format is used, a sinewave having a color carrier frequency is sampled with a repeating sampling rate and the sampled sine data are stored in the second memory unit 20. Tie first and second memory units 10 and 20 may be ROMs or the like. To collect cosine data, a cosine wave having a 90° phase difference from the sinewave used to collect the sine data, is used. The cosine wave is sampled at a predetermined rate and the sampled cosine data are stored in the first memory unit 10.

Color difference signals Cr and Cb are sampled to generate digital (sampled) color difference data Cr and Cb. The digital color difference data Cr and Cb are input to the first and second arithmetic units 30 and 40, respectively. The digital data Cr is multiplied with the cosine data stored in the first memory unit 10, and the digital data Cb is multiplied with the sine data stored in the second memory unit 20. That is, the sampled data from the first memory unit 10 are repeatedly output and multiplied with digital data Cr in the first arithmetic unit 30. Similarly, the sampled data from the second memory unit 20 are repeatedly output and multiplied with digital data Cb in the second arithmetic unit 40.

The results from the multiplication are added in the adder 50 to obtain a digital QAM signal, i.e. a digital composite color signal. This digital QAM signal is converted into an analog signal by a D/A converter 60 to generate an analog composite color signal.

FIGS. 3A–3C are views for explaining a process of fabricating a table containing the sine and cosine data to be multiplied with digital color data Cr and Cb.

In order to generate sine and cosine data, a repeat period for sine values is first determined. Then a set of sine values corresponding to the repeat period are sampled and stored. The set of stored sine values are then cyclically output and used to multiply with the sampled digital data Cb. The cosine values are obtained similarly, but they incorporate a phase difference of 90° compared to the sine values.

This process of formulating the sine values is described more in detail referring to FIGS. 3A–3C.

In the NTSC format, one screen picture is composed of 525 horizontal lines. Each of the horizontal lines includes 227.5 pulses, each pulse having a period of $1/f_{sc}$, where $f_{sc}$=subcarrier frequency. By dividing 1820 columns by 227.5 pulses, each of the sinusoidal pulses can be divided into 8 units as shown in FIG. 3A. According to the standards of a digital video cassette recorder (DVCR), there are 429 line color data pixels, and by using various filters and interpolation, 1716 line color data pixels (4×429=1716) can be obtained. Interpolation is a method of obtaining interpolated pixel values having similar characteristics as neighboring pixels using the pixel values.

FIG. 3B shows interpolated pixel values on a time axis T corresponding to the time axis shown in FIG. 3A. The point 280 of the horizontal line in FIG. 3A coincides with the point 264 of the horizontal line in FIG. 3B. Further, the phase of the point 280 at which both horizontal lines coincide is the same as the phase of the first point 0. From the points 1 in FIGS. 3A and 3B to the point 279 in FIG. 3A and the point 263 in FIG. 3B, which coincide with each other in time scale, are periodically repeated. Then by storing data corresponding to this repeat period, the stored data can be repeatedly used and it becomes unnecessary to separately store all of data after the repeat period.

FIG. 3C shows values sampled from the sinewave of FIG. 3A at points shown in FIG. 3B. The sampled values are 0, 93, 126, 76, −24, −108, −121, −55, . . . , −126, −93, 0, 93, . . . The data set from the sampled value "0" to the sample value "−93" covers a period of 264 pixels (0 pixel–263 pixel) and is cyclically repeated. By storing this data set of the repeat period, sampled values for all of the pixel values can be provided to the arithmetic unit.

In other words, the sampled values corresponding to points from the point 264 of FIG. 3C are repeated with 0, 93, 126, . . . . Therefore, only 264 types of pixel values need to be stored in the second memory unit 20. The stored pixel values (sine data) are repeatedly read from the second memory unit 20 and are supplied to the second arithmetic unit 40 for performing multiplication with the digital data Cb. The cosine data stored in the first memory unit 10 are the same as the sine data of the second memory unit 20, except a phase difference of 90°. The cosine data from pixel 0 to pixel 263 are 127, 85, −12, . . . , 85. This set of cosine data are repeatedly output for performing digital QAM on digital data Cr.

FIG. 4 shows a table containing sine and cosine sampled values used in performing QAM on the color difference signals Cr and Cb. The sine and cosine sampled values are obtained as described hereinabove. The sine and cosine data obtained according to the above described method are supplied to the second and first arithmetic units 40 and 30, respectively. In the first and second arithmetic units 30 and 40, sampled digital data Cr and Cb input thereto are multiplied with the stored cosine and sine data, respectively. The adder 50 adds the results of the multiplication to generate a digital composite color signal. The digital composite color signal is converted into an analog signal by the D/A converter 60 to generate an analog composite color signal. Thereafter, the analog composite color signal is combined with an analog luminance signal Y to generate an analog composite video signal.

Expressing the above-described method of formulating sine and cosine data in an equation, the stored sine data having 264 sampled values are represented with ST[i] where $0 \leq i < 264$ and i=integer, as shown in FIG. 4. The digital data Cr are represented by Cr[k] where $0 \leq k$ and k=integer. The digital data Cb are represented by Cb[k] where $0 \leq k$ and k=integer. Digital composite color signal values obtained by digital QAM are represented by Q[k] where $0 \leq k$ and k=integer. Then the final expression (1) for digital composite color signal values is:

$$Q[k]=Cr[k] \times CT[k \bmod 264]+Cb[k] \times ST[k \bmod 264] \quad (1).$$

According to the present invention, a digital QAM method modulates a digital color difference signal to overcome the noise problem in the conventional art and further allows generation of a more precise composite color signal. Generally, a digital video recording and reproducing device converts an analog video signal to a digital video signal using an analog-to-digital (A/D) converter, and recovers the original digital video data by compression, recording, reproducing and elongation processes. That is, an apparatus such as a digital video cassette recorder (DVCR) or a high-definition television (HDTV) receiver, obtains a digital video signal by sampling an analog video signal (luminance signal Y, color signals I and Q, color difference signals Cr and Cb) from a camera. The obtained digital video signal is compressed and stored. This stored digital video signal can be used and input to the first and second arithmetic units of the present invention.

In the present invention, digital data Cr and Cb are modulated using stored data sampled from sine and cosine waveforms. The modulated signals are added to each other to generate a digital composite color signal. The digital composite color signal, free of noise, is converted into an analog composite color signal to which a luminance signal is added to generate an analog composite video signal. A more precise and noise-free composite color signal is obtained in comparison with the composite color signal obtained using analog QAM in the conventional devices. As a result, defects in the video signal due to noise are minimized and a high resolution picture can be reproduced and displayed. Further, the present invention is advantageous because it provides a method for generating sine and cosine data for QAM whereby a set of sine and cosine data are stored in memory to perform digital QAM, continuously. This is an efficient way to perform digital QAM and considerably simplifies the device and method for generating a composite color signal according to the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of generating a composite color signal, comprising the steps of:

storing digital cosine data and sine data in at least one of first and second memories, modulating digital color data using the stored digital sine and cosine data; and generating a composite color signal using the modulated digital color data.

2. A method of claim 1, wherein the storing step includes the steps of:

providing th sine waveform having a predetermined frequency and a first phase;

sampling the sine waveform for a predetermined period at the repeating sampling rate; and storing the sampled values in the first memory.

3. A method of claim 2, wherein the storing step further includes the steps of:

providing the cosine waveform having the predetermined frequency and a second phase;

sampling the cosine waveform for a predetermined period at the repeating sampling rate; and storing the sampled values in the second memory.

4. A method of claim 3, wherein the first phase is 90° different from the second phase.

5. A method of claim 1, wherein the modulating step includes the step of:

performing digital quadruple amplitude modulation (QAM) on the digital color data.

6. A method of claim 1, wherein the digital color data includes digital color difference data Cr and digital color difference data Cb.

7. A method of claim 6, wherein the modulating step includes the steps of:

multiplying the digital color difference data Cr with the stored digital cosine data; and multiplying the digital color difference data Cb with the stored digital sine data.

8. A method of claim 7, wherein the generating step includes the step of:

adding results from the multiplying steps and thereby generating a digital composite color signal.

9. A method of claim 8, wherein the generating step further includes the step of:

converting the digital composite color signal into an analog composite color signal.

* * * * *